(12) United States Patent
Nakaya et al.

(10) Patent No.: US 10,293,409 B2
(45) Date of Patent: May 21, 2019

(54) MACHINE TOOL AND WORKPIECE PROCESSING SYSTEM

(71) Applicants: CITIZEN WATCH CO., LTD., Tokyo (JP); CITIZEN MACHINERY CO., LTD., Nagano (JP)

(72) Inventors: Takaichi Nakaya, Higashimurayama (JP); Mamoru Kubota, Tokyo (JP); Sakae Nakazawa, Komoro (JP); Kazuhiko Sannomiya, Kawagoe (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 34 days.

(21) Appl. No.: 15/322,676

(22) PCT Filed: Jun. 23, 2015

(86) PCT No.: PCT/JP2015/068063
§ 371 (c)(1),
(2) Date: Dec. 28, 2016

(87) PCT Pub. No.: WO2016/002589
PCT Pub. Date: Jan. 7, 2016

(65) Prior Publication Data
US 2017/0136547 A1 May 18, 2017

(30) Foreign Application Priority Data
Jun. 30, 2014 (JP) .................................. 2014-134634

(51) Int. Cl.
*B23B 3/30* (2006.01)
*B23Q 39/04* (2006.01)
(Continued)

(52) U.S. Cl.
CPC ................ *B23B 3/30* (2013.01); *B23Q 37/00* (2013.01); *B23Q 39/048* (2013.01); *B23Q 41/02* (2013.01); *B23Q 41/04* (2013.01)

(58) Field of Classification Search
CPC ...... B23Q 39/048; B23Q 37/00; B23Q 41/02; B23Q 41/04; B23B 3/30
See application file for complete search history.

(56) References Cited

U.S. PATENT DOCUMENTS 4,413,539 A * 11/1983 Ishizuka .................... B23B 3/06
29/36
4,457,193 A * 7/1984 Matthey .................... B23B 3/06
29/36

(Continued)

FOREIGN PATENT DOCUMENTS

| CN | 101410005 A | 4/2009 |
| CN | 102089102 | 6/2011 |

(Continued)

OTHER PUBLICATIONS

International Search Report issued in application No. PCT/JP2015/068063 dated Jul. 28, 2015 in 3 pages.
(Continued)

*Primary Examiner* — Sara Addisu
(74) *Attorney, Agent, or Firm* — Knobbe, Martens, Olson & Bear LLP

(57) ABSTRACT

In an embodiment, a machine tool includes two fixed modules and two movable modules each of which having a main spindle, a headstock, and a tool post being integrally formed, and a bed on which these are installed. The movable modules are provided on the bed to be movable in the Y-axis direction, the fixed modules are fixed on the bed on the opposite sides of the these movable modules, and a recess is provided next to the fixed module, the recess being formed by cutting out the bed. The movable modules are movable (Continued)

such that the axis lines of the main spindles of the movable modules are aligned with the axis line of the main spindle of the fixed module or the fixed module. The movable module is movable to the opposite position of the recess.

11 Claims, 12 Drawing Sheets

(51) Int. Cl.
    *B23B 3/06*     (2006.01)
    *B23B 3/34*     (2006.01)
    *B23Q 37/00*     (2006.01)
    *B23Q 41/02*     (2006.01)
    *B23Q 41/04*     (2006.01)

(56) References Cited

U.S. PATENT DOCUMENTS

| | | | |
|---|---|---|---|
| 4,612,832 A * | 9/1986 | Ushigoe | B23B 3/167 |
| | | | 29/36 |
| 5,097,575 A * | 3/1992 | Mitsukuchi | B23B 3/06 |
| | | | 29/27 C |
| 5,127,140 A * | 7/1992 | Oiwa | B23B 3/167 |
| | | | 29/27 C |
| 7,219,407 B2 * | 5/2007 | Schneider | B23B 3/065 |
| | | | 29/27 C |
| 2002/0073531 A1 | 6/2002 | Miyano | |
| 2003/0029286 A1 * | 2/2003 | Kumano | B23B 3/167 |
| | | | 82/121 |
| 2005/0076757 A1 * | 4/2005 | Kikuchi | B23B 3/168 |
| | | | 82/129 |
| 2005/0217442 A1 * | 10/2005 | Akimoto | B23B 3/065 |
| | | | 82/129 |
| 2006/0104751 A1 | 5/2006 | Arai | |
| 2009/0099680 A1 | 4/2009 | Usui | |
| 2011/0067535 A1 * | 3/2011 | Tsai | B23B 3/167 |
| | | | 82/121 |
| 2011/0158775 A1 * | 6/2011 | Ando | B23B 3/36 |
| | | | 414/222.07 |
| 2012/0189395 A1 | 7/2012 | Affaticati et al. | |
| 2015/0258649 A1 * | 9/2015 | Nakazawa | B23Q 7/04 |
| | | | 82/124 |

FOREIGN PATENT DOCUMENTS

| | | | | |
|---|---|---|---|---|
| CN | 102574228 A | | 7/2012 | |
| CN | 103341761 A | | 10/2013 | |
| DE | 10 2008 050 967 A1 | | 4/2009 | |
| EP | 2 305 404 A1 | | 4/2011 | |
| JP | 03161202 A | * | 7/1991 | ........... B23Q 39/048 |
| JP | 04025333 A | * | 1/1992 | ........... B23Q 39/048 |
| JP | 04122501 A | * | 4/1992 | ........... B23Q 39/048 |
| JP | 2002292502 A | * | 10/2002 | ............. B23Q 1/015 |
| JP | 3878418 B2 | | 2/2007 | |
| JP | 4380756 B2 | | 12/2009 | |
| JP | 2013-136137 A | | 7/2013 | |
| KR | 10-2011-0036731 | | 4/2011 | |
| KR | 10-2012-0049896 A | | 5/2012 | |
| WO | WO 2010-004961 A1 | | 1/2010 | |
| WO | WO 2011-010209 A1 | | 1/2010 | |

OTHER PUBLICATIONS

Written Opinion issued in application No. PCT/JP2015/068063 dated Jul. 28, 2015 in 4 pages.
Extended European Search Report; Application No. 15814940.1; dated Jan. 26, 2018; 8 pages.
First Office Action and Search Report issued in Chinese Patent Application No. 201580033474.4, dated Feb. 27, 2018.
Office Action issued in Korean Patent Application No. 10-2017-7002536, dated Jun. 10, 2017.
Office Action issued in Taiwanese Patent Application No. 104120948 dated Oct. 17, 2018, 7 pages.

\* cited by examiner

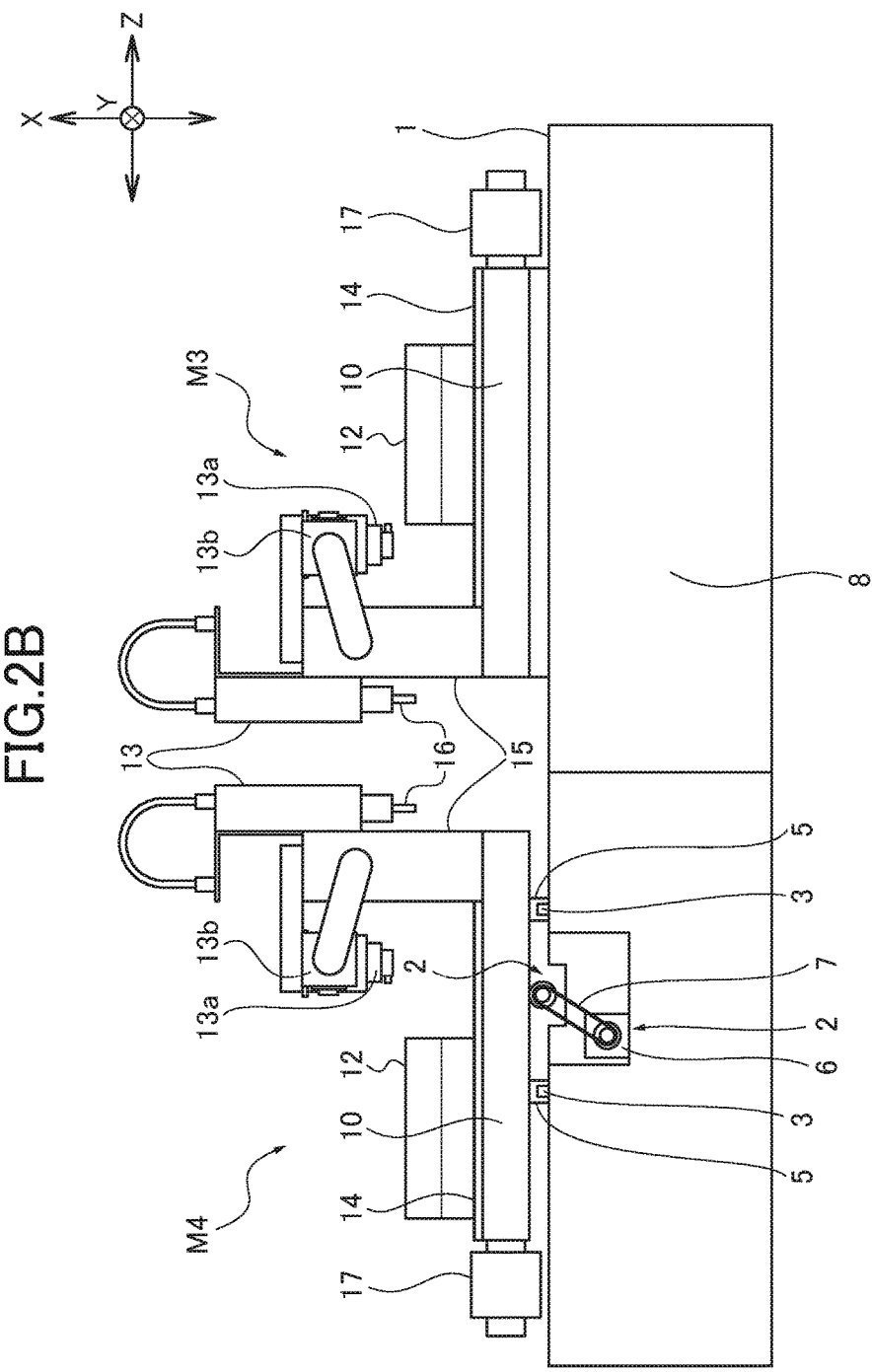

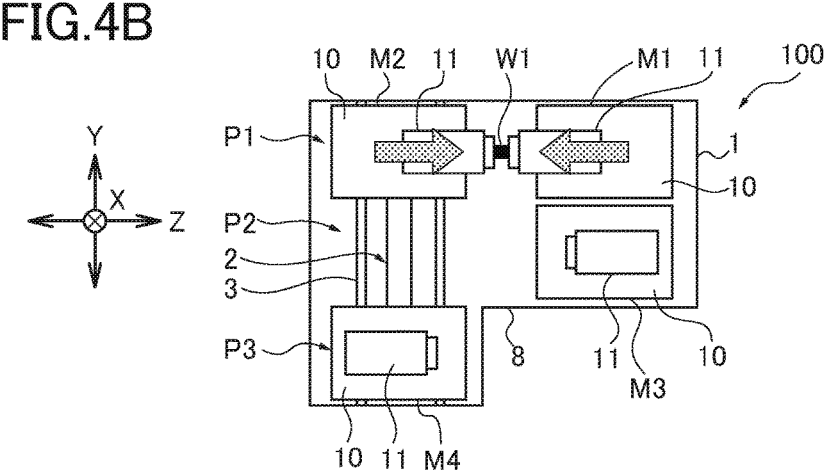
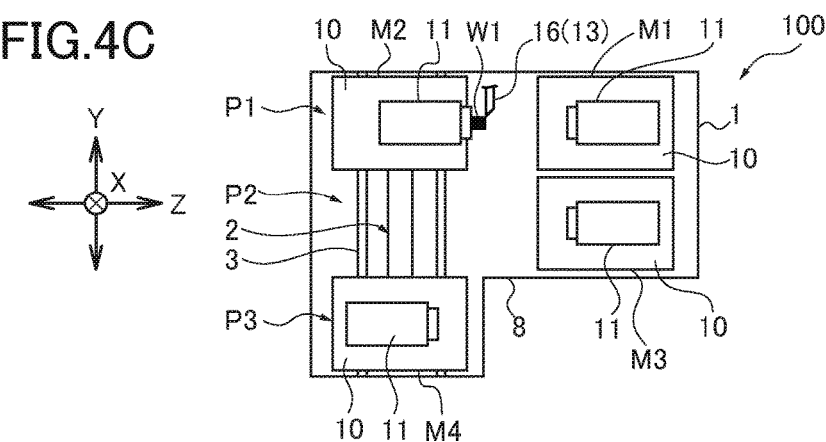
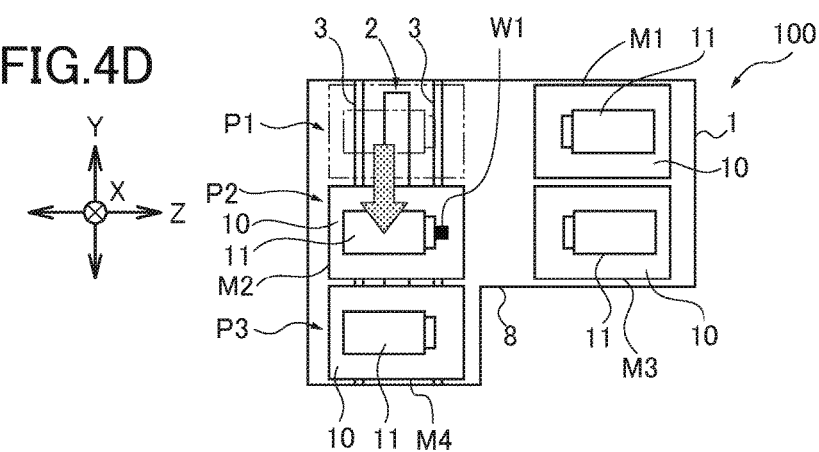

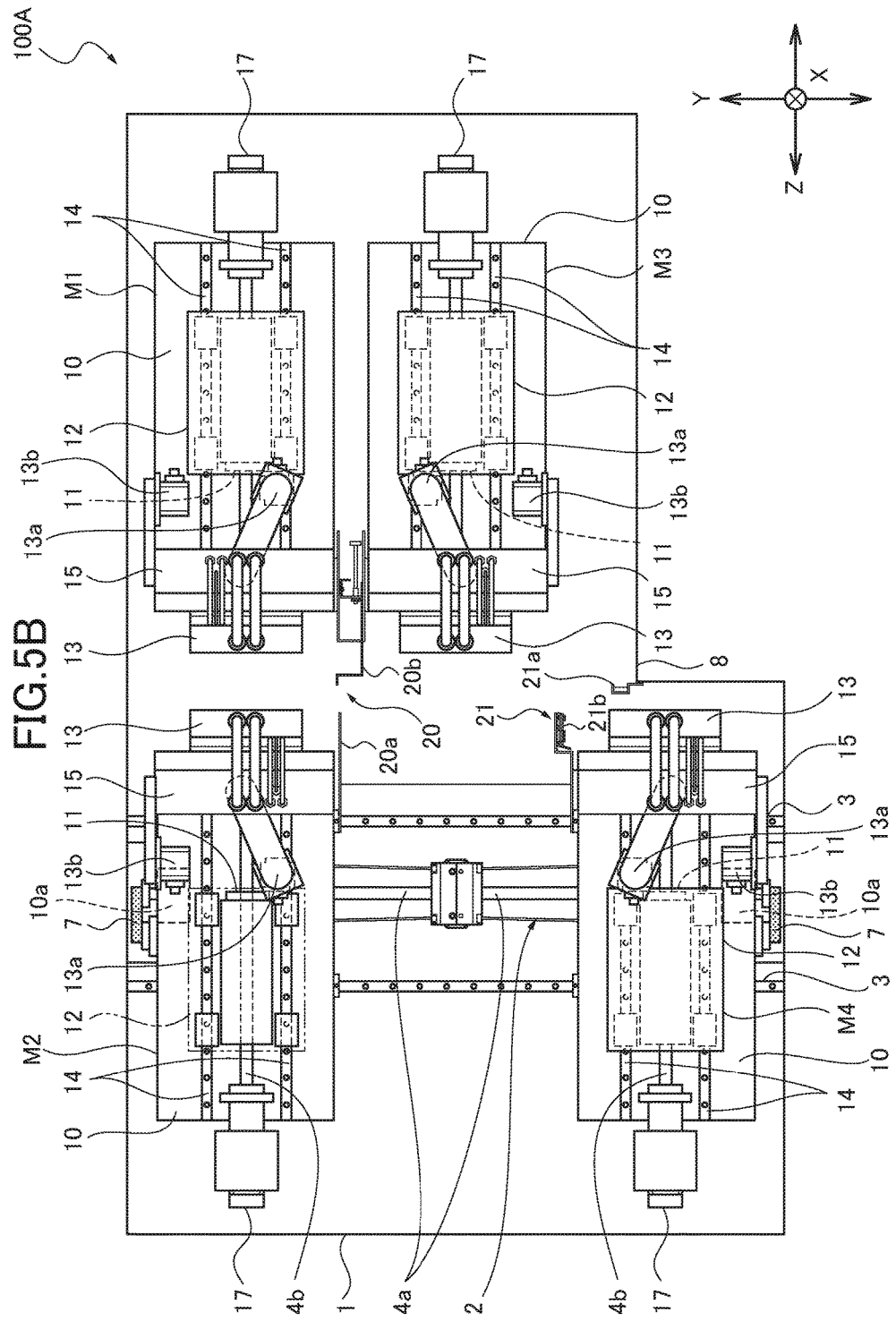

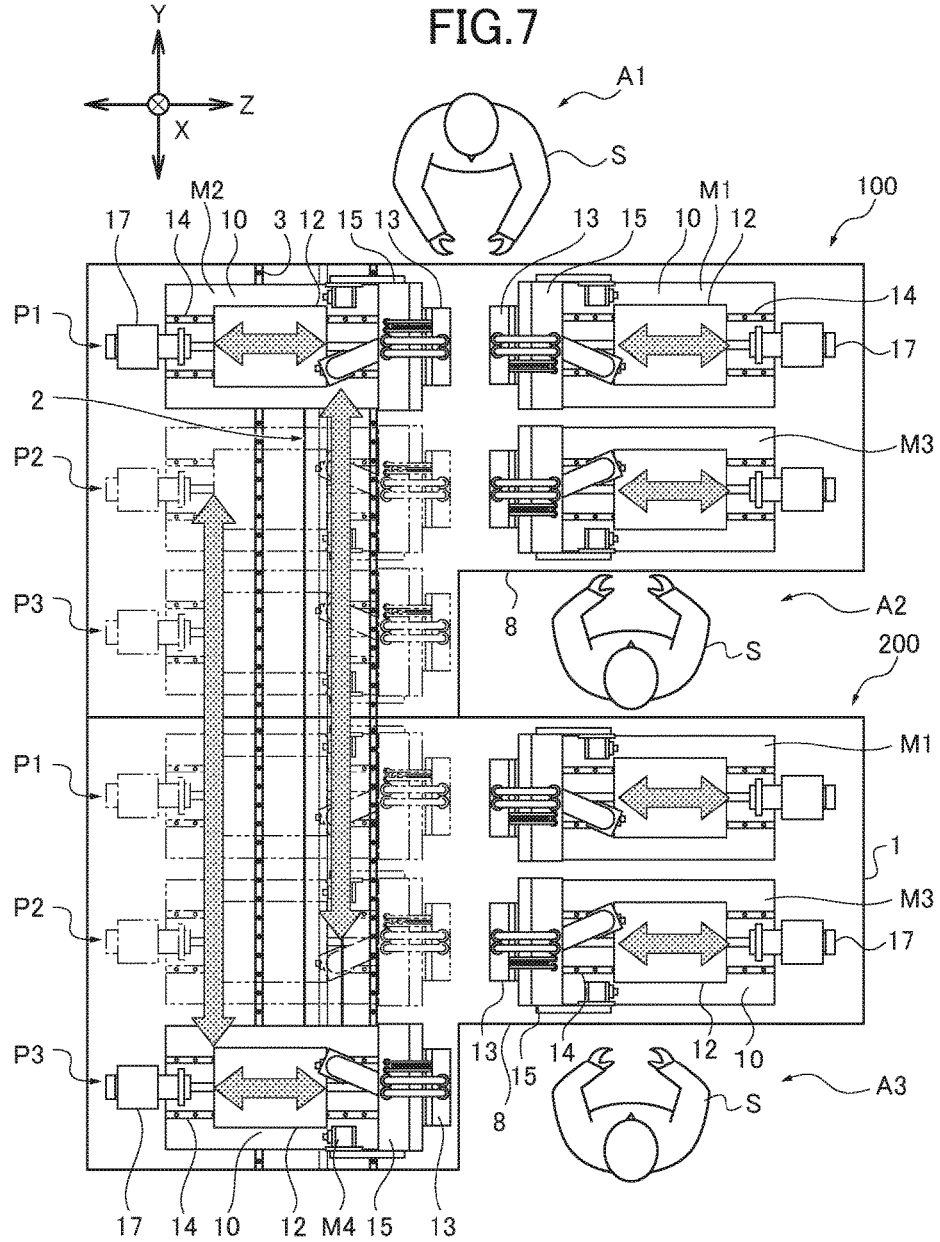

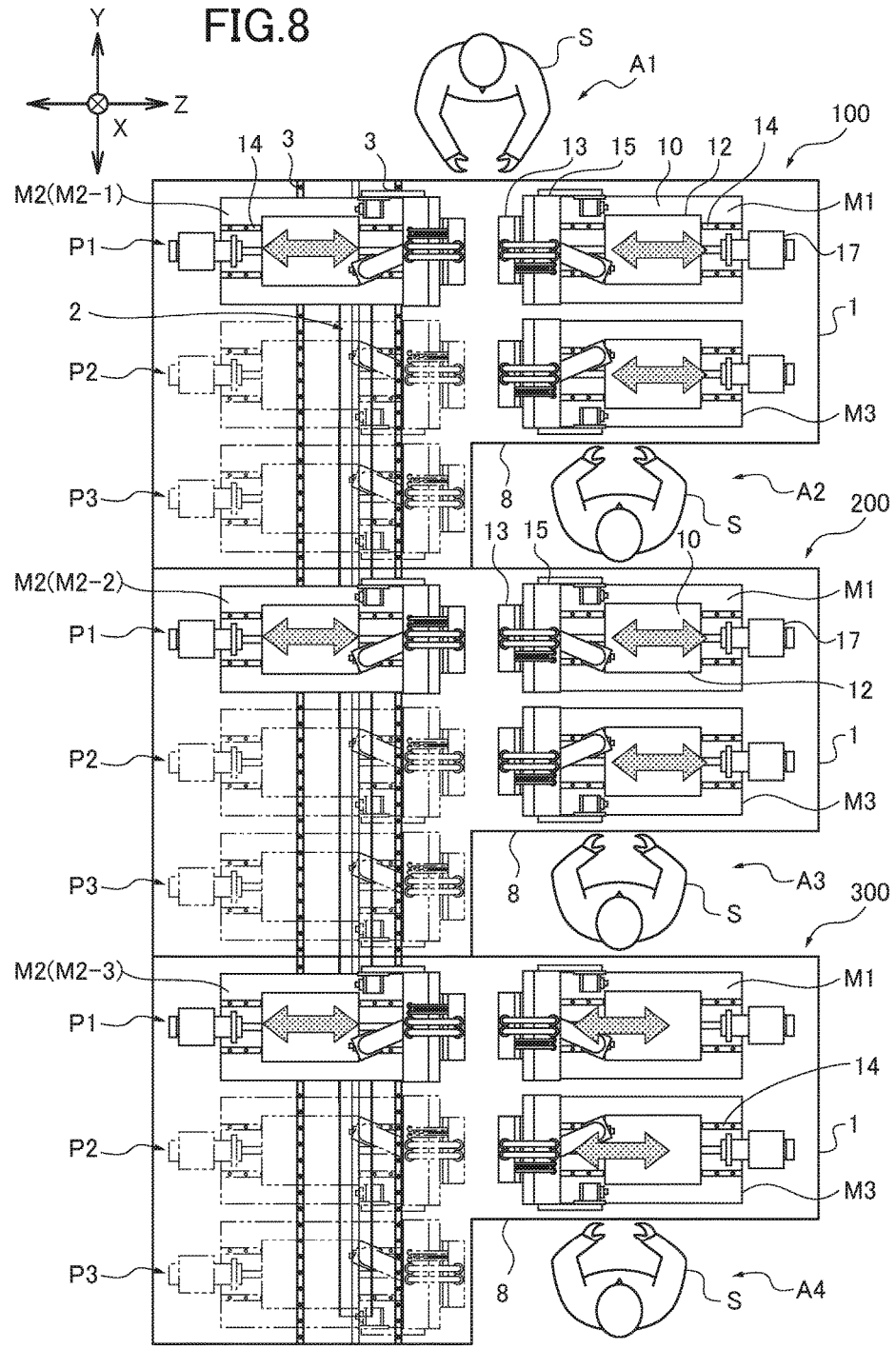

MACHINE TOOL AND WORKPIECE PROCESSING SYSTEM

CROSS-REFERENCE TO RELATED APPLICATIONS

This application is the U.S. National Phase under 35 U.S.C. § 371 of International Application No. PCT/JP2015/068063, filed Jun. 23, 2015, which claims priority to Japanese Patent Application No. 2014-134634, filed Jun. 30, 2014. The entire contents of these applications are incorporated herein by reference.

BACKGROUND

The present disclosure relates to a machine tool and a workpiece processing system using the machine tool.

DESCRIPTION OF THE RELATED ART

A machine tool including a plurality of modules and a bed on which the modules are installed has been conventionally known. Each of the modules is integrally provided with a main spindle which grips a workpiece and a tool post which holds tools for processing the workpiece griped by the main spindle. The modules of the machine tool are configured by two modules arranged in parallel and an opposite module arranged in the opposite sides of the two modules. In such a machine tool, the workpiece is processed while being transferred among predetermined modules (refer to Patent Literature 1, for example).

Patent Literature 1: WO2010/004961A1

SUMMARY

The machine tool is easily designed into various configurations to have relatively free layout for the respective modules. For example, when a plurality of modules is provided to be movable in the direction orthogonal to the axis line direction of the main spindle, so as to transfer the workpiece among the modules near the center of the bed, it becomes difficult for an operator and a tool to reach the main spindle, or an operation direction is limited during maintenance. The operation performance and the maintenance performance are therefore lowered.

The present disclosure has been made in view of the above circumferences, and an object of the present disclosure is to provide a machine tool and a workpiece processing system having a good processing productivity of a workpiece, and capable of improving a maintenance performance and an operation performance.

A machine tool according to the present disclosure includes a plurality of modules each including a workpiece holder that holds a workpiece and an operation part holder that holds an operation part for performing a predetermined operation to the workpiece held by the workpiece holder, the workpiece holder and the operation part holder being integrally provided, and a bed on which each of the modules is installed. The modules include two modules arranged in parallel and opposite modules disposed on opposite sides of the two modules. The workpiece is processed while being transferred among predetermined modules. The modules arranged in parallel are provided as movable modules to be movable in an arrangement direction. A recess is provided next to the opposite module, and the recess being formed by cutting out the bed. The movable modules are movable to be aligned with the opposite modules, respectively. At least one of the movable modules is provided to be movable in an opposite position of the recess.

A workpiece processing system according to the present disclosure includes a plurality of machine tools as described above arranged in parallel through the recess.

According to the machine tool and the workpiece processing system of the present disclosure, a good processing productivity of a workpiece is obtained, and a maintenance performance and an operation performance are improved.

BRIEF DESCRIPTION OF DRAWINGS

FIG. 2B is a back view of the machine tool seen from a recess side.

FIG. 4B is a schematic view showing the transferring of the workpiece from the fixed module M1 to a movable module M2.

FIG. 4C is a schematic view showing the processing of the workpiece by the movable module M2.

FIG. 4D is a schematic view showing the movable module M2 moved to the opposite position of a fixed module M3.

FIG. 5B is a plan view showing the open first isolation wall and the open second isolation wall in the machine tool in FIG. 5A.

FIG. 7 is a plan view briefly showing a configuration of a workpiece processing system according to an embodiment.

FIG. 8 is a plan view briefly showing a configuration of a workpiece processing system according to an embodiment.

DETAILED DESCRIPTION

Figure 1:
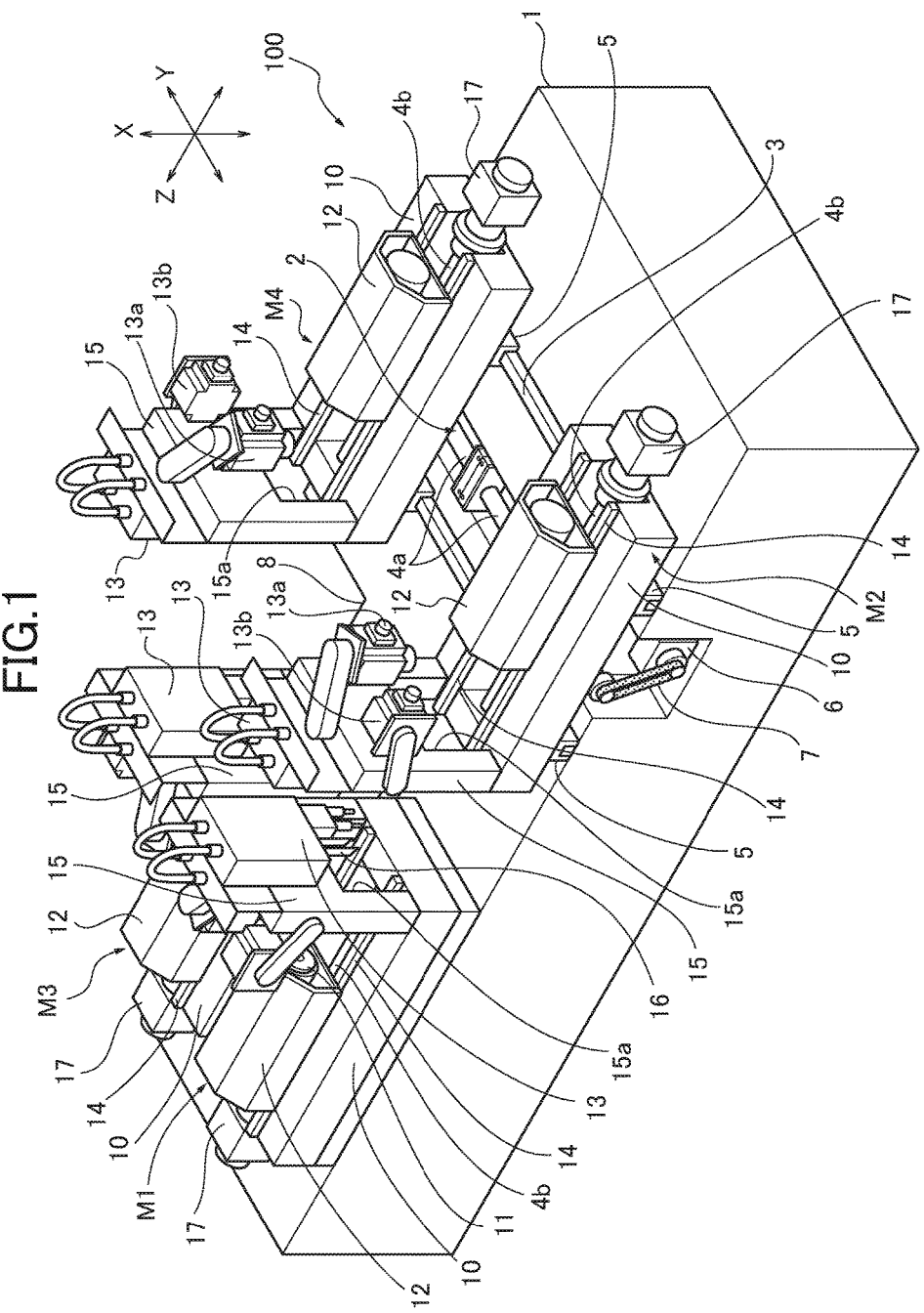
FIG. 1 is a perspective view showing a general entire configuration of a machine tool according to an embodiment.

Hereinafter, an embodiment of a machine tool (automatic lathe) according to the present disclosure will be described with reference to the drawings. As illustrated in the perspective view of FIG. 1, the plan view of FIG. 2A, and the back view of FIG. 2B, a machine tool 100 of the present embodiment includes a bed 1. Four modules M1, M2, M3, and M4 are installed on the bed 1. Hereinafter, an axis line direction of a main spindle 11 of each of the modules M1, M2, M3, and M4 is referred to as a Z-axis direction, a direction orthogonal to the Z-axis direction in the horizontal direction is referred to as a Y-axis direction, and a direction orthogonal to the Z-axis direction and the Y-axis direction is referred to as an X-axis direction.

The two modules M2 and M4 are arranged on the bed 1 in parallel in the Y-axis direction through a sliding mechanism 2, such that the Z-axis directions of the two modules M2 and M4 are parallel. The sliding mechanism 2 includes a guide rail 3 extending in the Y-axis direction and a ball screw 4a. The modules M2 and M4 reciprocate on the guide rail 3 in the Y-axis direction (hereinafter, modules M2 and M4 are referred to as movable modules M2 and M4). The two modules M1 and M3 are arranged on the opposite sides of the movable modules M2 and M4, such that the Z-axis directions of the modules M1 and M3 are parallel in the Y-axis direction. The two modules M1 and M3 are fixed on the bed 1 to be unmovable in the Y-axis direction (hereinafter, modules M1 and M3 are referred to as fixed modules M1 and M3).

Figure 2A:
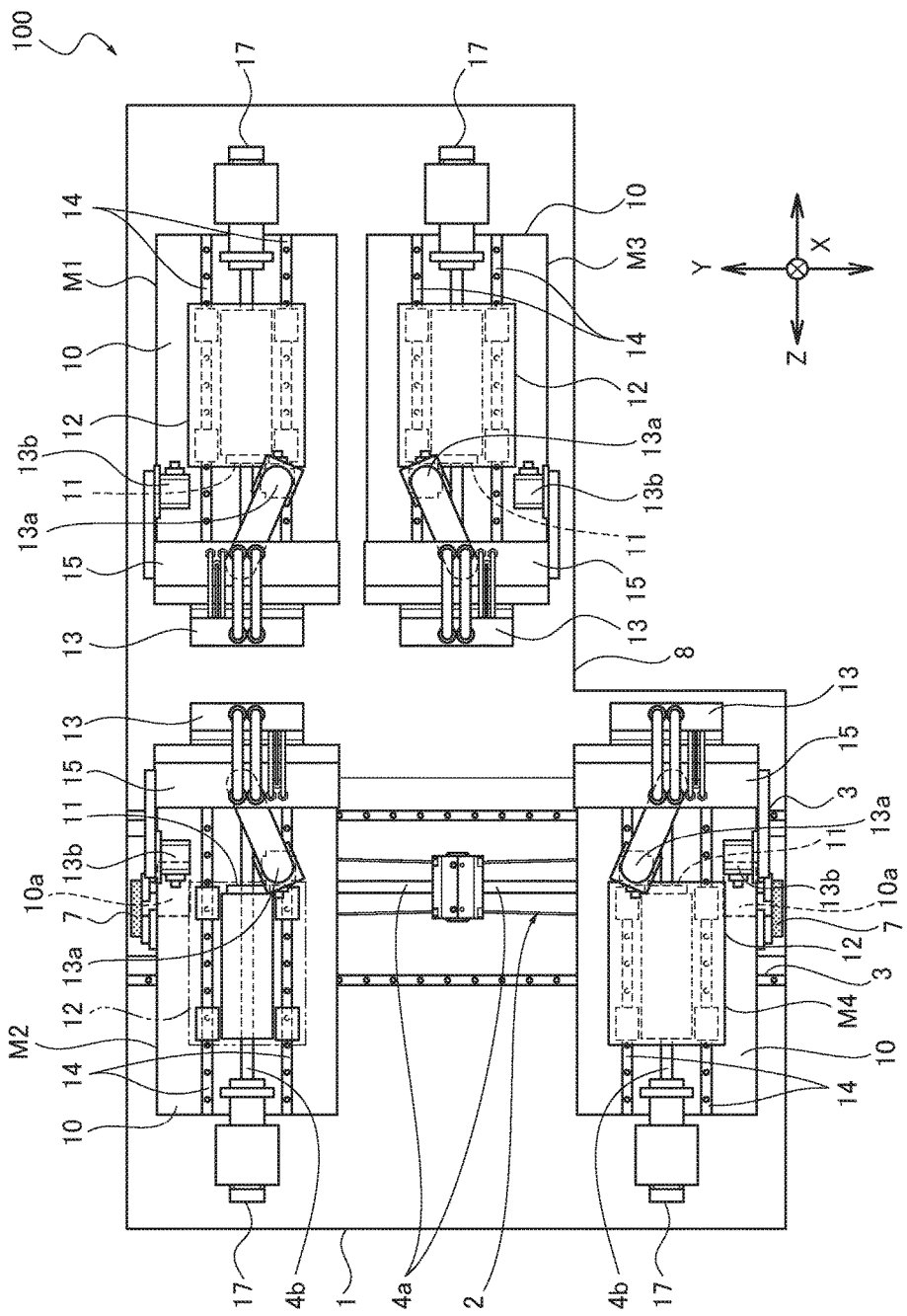
FIG. 2A is a plan view of the machine tool in FIG. 1.

As illustrated in FIG. 2A, the bed 1 includes a recess 8 formed in one corner thereof along the Y-axis and Z-axis directions. The bed 1 has an approximate L-shape in a planer view. The fixed module M3 is arranged along the outer circumference edge of the bed 1 on the recess 8 side to abut on the recess 8. The fixed module M1 is arranged along the outer circumference edge of the bed 1 on the opposite side of the recess 8 across the fixed module M3.

Each of the modules M1, M2, M3, and M4 has the same basic configuration. A headstock 12 that supports the main spindle 11 and a tool post 13 by which a tool 16 for processing a workpiece griped by the main spindle 11 are integrally provided on a base 10.

A known built-in motor (not shown) is provided between the main spindle 11 and the headstock 12. The main spindle 11 rotates about the center of the axis line by the built-in motor. The main spindle 11 includes in a front end portion (central direction of Z-axis direction of bed 1) thereof a chuck (not shown), and detachably grips the workpiece by the opening and closing operation of the chuck.

Two guide rails 14 are provided on each of the bases 10 to be parallel in the Y-axis direction. Each of the guide rails 14 extends in the Z-axis direction. The headstock 12 is placed on the guide rails 14. The headstock 12 is threadably mounted on the ball screw 4b provided between the guide rails 14. The ball screw 4b rotates by a motor 17, and the headstock 12 reciprocates on the guide rails 14 in the Z-axis direction together with the main spindle 11 (refer to FIG. 3).

A supporting base 15 is fixed to the base 10 in front of the headstock 12. The tool post 13 is provided in front of the supporting base 15 to be movable in the X-axis direction and the Y-axis direction. The tool post 13 moves in the X-axis direction and the Y-axis direction by an X-axis motor 13a and a Y-axis motor 13b.

As illustrated in FIG. 1, the supporting base 15 is formed into a gate shape having an opening 15a. The headstock 12 passes through the opening 15a. The headstock 12 is disposed to pass through the opening 15a of the supporting base 15, so that the workpiece griped by the main spindle 11 faces the tool post 13 provided in front of the supporting base 15.

Each of the modules M1, M2, M3, and M4 holds the workpiece with the main spindle 11 by the driving control with a controller (not shown), and processes the workpiece into a predetermined shape while selecting the predetermined tool 16 of the tool post 13 by controlling the rotation of the main spindle 11, the movement of the headstock 12 in the Z-axis direction, and the movement of the tool post 13 in the X-axis direction and the Y-axis direction. Each of the modules M1, M2, M3, and M4 has a processing region of the workpiece in front of the supporting base 15 (tool post 13 side), and operates as a lathe for processing the workpiece by arranging the end portion of the main spindle 11 in the processing region. Namely, the machine tool 100 includes a plurality of lathes combined as the modules.

Figure 3:
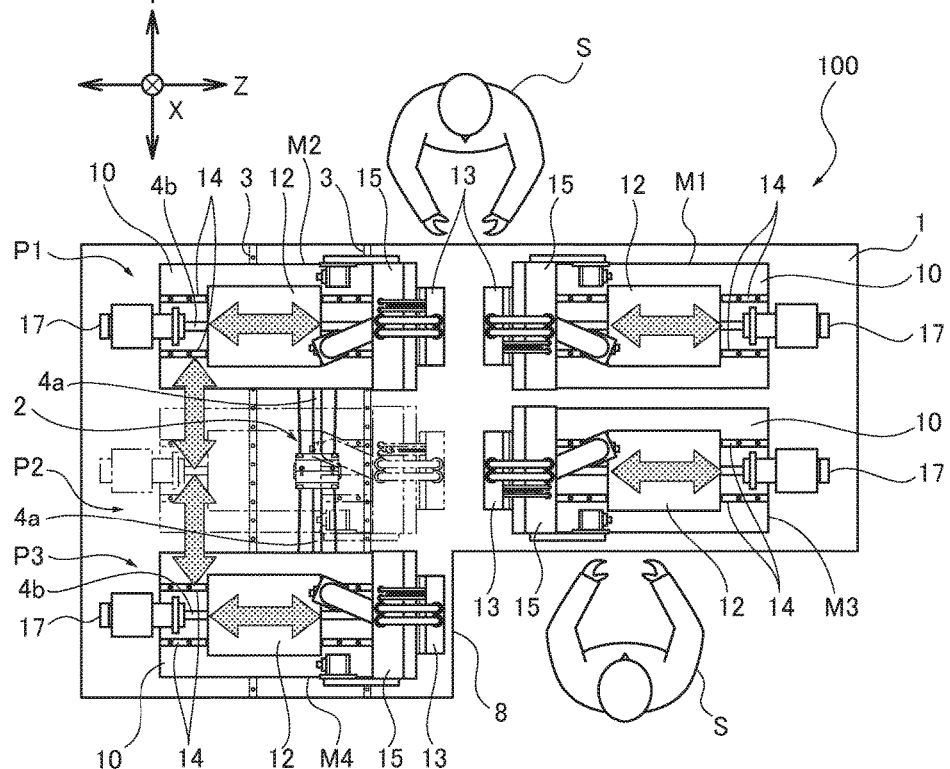
FIG. 3 is a plan view of the machine tool in FIG. 1, showing a moving direction of each module and a positional relationship between each module and an operator.

As illustrated in FIGS. 1 to 3, the bases 10 of the fixed modules M1 and M3 are fixed on the bed 1. The two guide rails 3 are disposed in parallel in the Z-axis direction, and are provided on the bed 1 to extend from the opposite position of the fixed module M1 to the opposite position of the recess 8. A sliding body 5 is slidably mounted on the guide rail 3. The bases 10 of the movable modules M2 and M4 are fixed to the sliding bodies 5, respectively, and are supported on the guide rails 3 to be movable along the guide rail 3.

The bases 10 of the movable modules M2 and M4 are threadably mounted on the ball screws 4a, respectively, provided between the separate guide rails 3 through nuts 10a. Each of the ball screws 4a is coaxially disposed, and is connected to each of driving motors 6 provided in the bed 1 through a belt 7, as shown in FIGS. 1 and 2B. Each of the movable modules M2 and M4 independently reciprocates in the Y-axis direction along the guide rails 3 by rotating each of the driving motors 6.

In the machine tool 100 of the present embodiment, as shown in FIG. 2A, the nut 10a is disposed in the end portion of the bottom surface of the base 10. As shown in FIG. 3, when the movable module M4 moves to face the recess 8, the movable module M2 faces both of the fixed modules M1 and M3. In this case, the nut 10a does not abut on the end portion of the ball screw 4a. The movable module M2 moves to the positions where the axis line of the main spindle of the movable module M2 is aligned with the axis lines of the main spindles of the fixed modules M1 and M3. When the movable module M2 moves to the position to face the fixed module M1, the movable module M4 faces the fixed module M3, such that the axis line of the main spindle of the movable module M4 is aligned with the axis line of the main spindle of the movable module M3.

By the movement of the movable modules M2 and M4 to the opposite position of the fixed module M1 or the fixed module M3 such that the axis lines of the main spindles of the modules are aligned with each other, and the movement of the headstocks 12 of the modules in the directions close to each other, the workpiece is transferred between the movable module and the fixed module.

The movable modules M2 and M4 are disposed near the outer circumference edge of the bed 1 in the Y-axis direction and near the end edge of the recess 8 when the movable modules M2 and M4 move to face the fixed module M1 or the fixed module M3. An operator S therefore positions near the outer circumference edge of the bed 1 on the fixed module M1 side or in the recess 8, so that the operator S and the tool easily reach each part of each module M1, M2, M3, and M4 and the transferring part of the workpiece between the fixed module M1 and M3 and the movable module M2 or the movable module M4. The maintenance operation is thus easily performed.

More specifically, even when four modules are installed on one bed 1 as the machine tool 100 of the present embodiment, adjustment such as the maintenance of each module and the transferring of the workpiece is easily performed. The freedom of the layout of each module is thus improved, and the machine tool is variously configured. The processing productivity of the workpiece is therefore improved.

In this embodiment, the two fixed modules M1 and M3 are provided as the opposite modules disposed in the opposite sides of the two movable modules M2 and M4 arranged in parallel. However, the present disclosure is not limited to this configuration. In one example, the fixed module M3 is only provided in the bed 1 as the opposite module, and the movable modules M2 and M4 are provided to be movable in the Y-axis direction relative to the fixed module M3. With this configuration, when the operator S positions in the recess 8, the operator S and the tool easily reach the transferring part of the workpiece between the fixed module M3 and the movable module M2 or the movable module M4. The operation performance and the maintenance performance are thus improved.

When only one fixed module M3 is provided as the opposite module, the recess 8 may be provided on both sides of the fixed module M3. With this configuration, when the operator S positions in one of the recesses 8, the operator S adjusts the transferring part of the workpiece between the fixed module M3 and the movable module M2 or the movable module M4 from one of the right and left directions. The operation performance and the maintenance performance are thus improved. After the maintenance, a loader or unloader for the workpiece is disposed in the recess 8. The workpiece is thus easily supplied and carried out.

In this embodiment, the opposite module is fixed on the bed 1 as the fixed module in an unmovable manner in the Y-axis direction. However, the present disclosure is not limited to this configuration. The opposite module may be movable in the Y-axis direction by a sliding mechanism to face one of the movable modules. With this configuration, both of the movable modules or both of the opposite modules appropriately move to face each other. The workpiece is thereby transferred and the processing order of the workpiece is freely set, which achieves various processing steps. During the maintenance, each of the modules moves to the position where the adjustment for the maintenance operation and the transferring operation is simplified. The operation performance and the maintenance performance are thus improved.

In the present embodiment, the example in which each of the modules M1, M2, M3, and M4 is a lathe module including a workpiece holder that holds a workpiece, an operation part that performs a predetermined operation to the workpiece held by the workpiece holder, and an operation part holder that holds the operation part. The workpiece holder is the main spindle 11 that grips the workpiece, the operation part is the tool 16 that processes the workpiece griped by the main spindle, and the operation part holder is the tool post 13 that holds the tool 16. However, the predetermined module may be a processing module for grinding, milling, and gear cutting or a measurement module in which the operation part is a measurement part and a measurement operation is modulated. The predetermined module may be a machine tool that performs complex processing and measurement after processing.

The processing of the workpiece using the machine tool 100 of the present embodiment will be described with reference to FIGS. 4A to 4J. To simplify the description, the configuration of each of the modules M1, M2, M3 and M4 is simplified and is shown only by the base 10 and the main spindle 11 in these figures. A plurality of workpieces W1, W2, W3, ... is consequently processed.

In the following description, the workpiece is processed by the fixed module M1, the movable module M2, the fixed module M3, and the movable module M4 in order while being transferred among the modules. However, the present disclosure is not limited to this order. The workpiece may be processed by the modules in a desired order depending on the processing purpose while being transferred among the modules.

The workpiece W1 is supplied to the fixed module M1. In this case, the short workpiece W1 is supplied to the main spindle 11 of the fixed module M1 by a loader (not shown), for example. A bar workpiece may be supplied by a bar feeder (not shown) from the back of the fixed module M1.

Figure 4A:
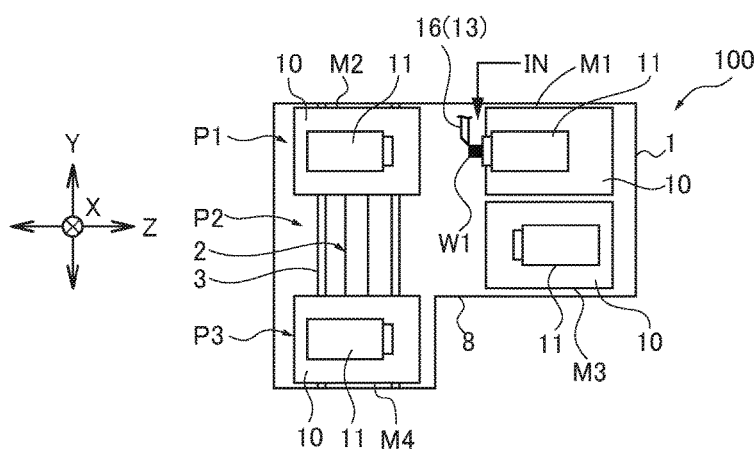
FIG. 4A is a schematic view describing processing of a workpiece by the machine tool in FIG. 1 and showing the processing of the workpiece by a fixed module M1.

As shown in FIG. 4A, the workpiece W1 is processed by the tool 16, which is selected depending on the processing, in the fixed module M1.

When the fixed module M1 completes the processing of the workpiece W1, the movable module M2 positions in the opposite position P1 of the fixed module M1, and the main spindle 11 of the fixed module M1 and the main spindle 11 of the movable module M2 move in the directions close to each other to transfer the workpiece W1 (FIG. 4B). After that, the workpiece W1 is processed by the movable module M2 by which the workpiece W1 is received (FIG. 4C).

Figure 4E:
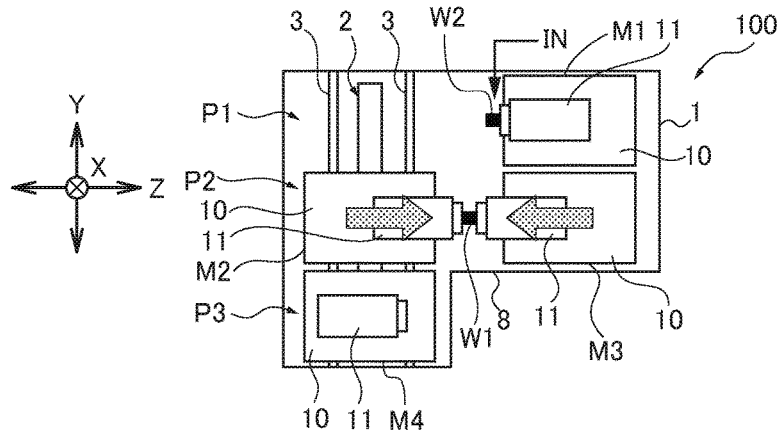
FIG. 4E is a schematic view showing the transferring of the workpiece from the movable module M2 to the fixed module M3, and the fixed module M1 to which a second workpiece is supplied.

After the processing is completed or during the processing operation of the workpiece W1, the movable module M2 moves to the opposite position P2 of the module M3 from the opposite position P1 (FIG. 4D). The movable module M2 performs the processing in the opposite position P2. Next, the main spindle 11 of the movable module M2 and the main spindle 11 of the fixed module M3 move in the directions close to each other to transfer the workpiece W1. While the workpiece W1 is transferred, the second workpiece W2 is supplied to the main spindle 11 of the fixed module M1 (FIG. 4E).

Figure 4F:
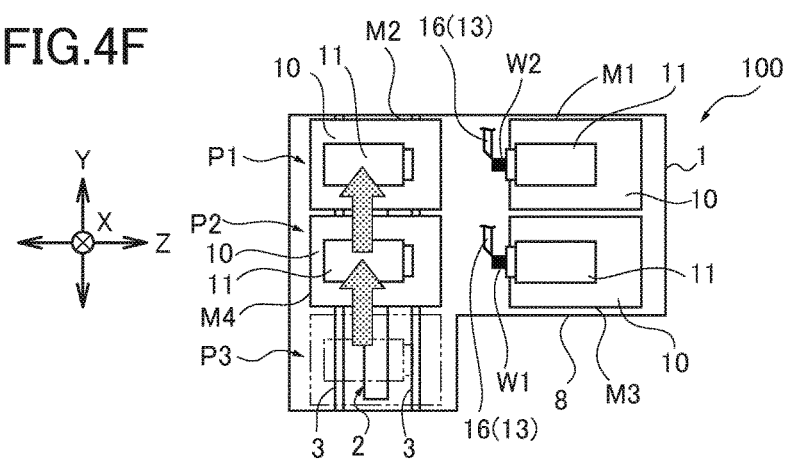
FIG. 4F is a schematic view showing the processing of the first workpiece by the fixed module M3 and the processing of the second workpiece by the fixed module M1.

The workpiece W1 is processed by the fixed module M3 by which the workpiece W1 is received. While the workpiece W1 is processed, the second workpiece W2 is processed by the fixed module M1 (FIG. 4F).

Figure 4G:
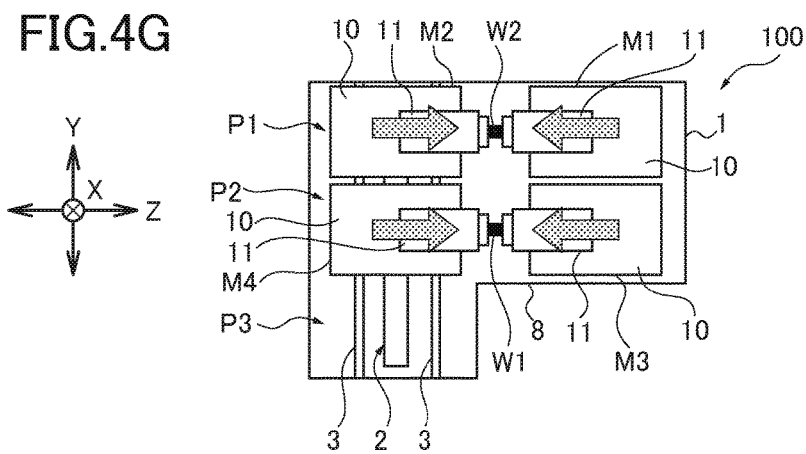
FIG. 4G is a schematic view showing the transferring of the first workpiece from the fixed module M3 to a movable module M4, and the transferring of the second workpiece from the fixed module M1 to the movable module M2.

When the fixed module M3 completes the processing of the workpiece W1, the movable module M4 moves to the opposite position P2 of the fixed module M3, and the main spindle 11 of the fixed module M3 and the main spindle 11 of the movable module M4 move in the directions close to each other to transfer the workpiece W1. While the workpiece W1 is transferred, the movable module M2 positions in the opposite position P1 of the fixed module M1, and the main spindle 11 of the fixed module M1 and the main spindle 11 of the movable module M2 move in the directions close to each other to transfer the workpiece W2 (FIG. 4G).

Figure 4H:
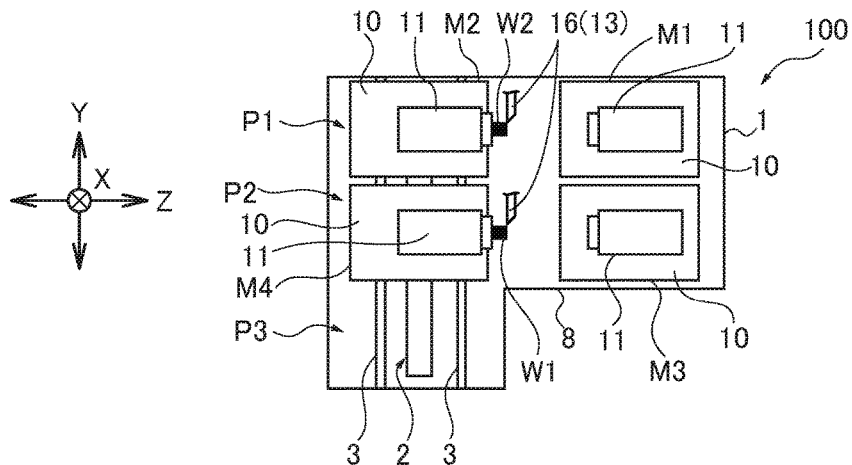
FIG. 4H is a schematic view showing the processing of the first workpiece by the movable module M4 and the processing of the second workpiece by the movable module M2.

The workpiece W1 is processed by the movable module M4 by which the workpiece W1 is received. While the workpiece W1 is processed, the workpiece W2 is processed by the movable module M2 by which the workpiece W2 is received (FIG. 4H).

Figure 4I:
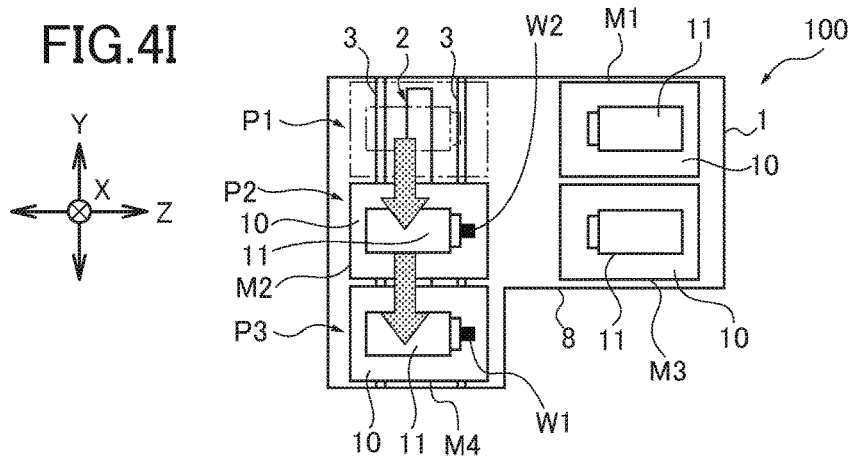
FIG. 4I is a schematic view showing the movable module M4 moved to the opposite position of the recess, and the movable module M2 moved to the opposite position of the fixed module M3.

After the movable module M4 completes the processing of the workpiece W1 or while the movable module M4 processes the workpiece W1, the movable module M4 moves to the opposite position P3 of the recess 8 from the opposite position P2. While the movable module M4 moves, the movable module M2 moves to the opposite position P2 of the fixed module M3 from the opposite position P1 after the movable module M2 completes the processing of the workpiece W2 or while the movable module M2 processes the workpiece W2 (FIG. 4I). In addition, the movable modules M2 and M4 may perform the processing in the opposite positions P2 and P3.

Figure 4J:
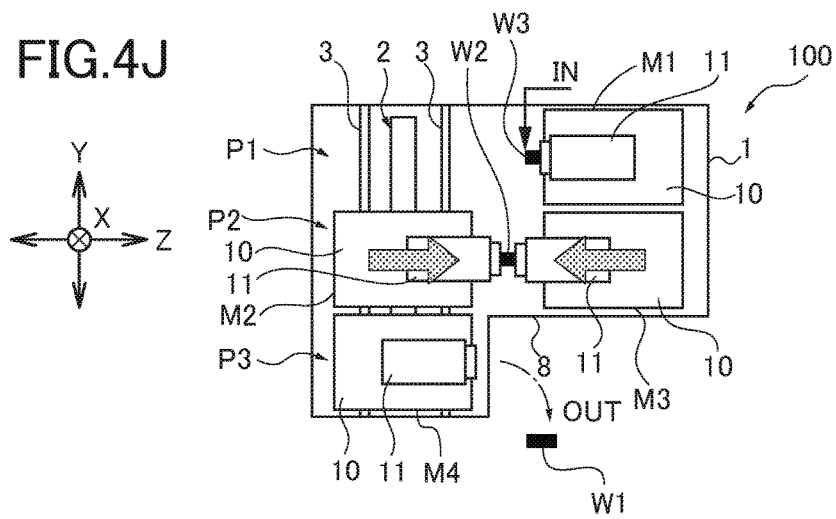
FIG. 4J is a schematic view showing the processed workpiece carried out from the movable module M4, the transferring of the second workpiece from the movable module M2 to the fixed module M3, and the fixed module M1 to which a third workpiece is supplied.

Then, the processed workpiece W1 is carried out from the main spindle 11 of the movable module M4 in the opposite position P3. While the processed workpiece W1 is carried out, the main spindle 11 of the movable module M2 and the main spindle 11 of the fixed module M3 move in the directions close to each other to transfer the workpiece W2, and a third workpiece W3 is supplied to the fixed module M1 (FIG. 4J).

After that, similar to the first workpiece W1, the workpiece W2 is processed by the fixed module M3. After the workpiece W2 is transferred to the movable module M4 to be processed, the workpiece W2 is carried out from the movable module M4. The subsequent workpieces after the third workpiece W3 are similarly transferred and the processed.

As described above, the workpiece is processed while being transferred among the four modules M1, M2, M3, and M4, and a plurality of workpieces is processed in parallel. The modules M1, M2, M3, and M4 are effectively operated to improve the processing productivity.

Next, another embodiment of the machine tool according to the present disclosure will be described with reference to FIGS. 5A and 5B. A machine tool 100A of the present embodiment shown in FIGS. 5A and 5B has the basic configuration similar to that of the machine tool 100 of the embodiment shown in FIGS. 1 to 3. The fixed modules M1 and M3 and the movable modules M2 and M4 are installed on the bed 1 having the recess 8. In this embodiment, as the recess 8 is provided in the bed 1, an operator and a tool easily reaches each part of each module M1, M2, M3, and M4. The maintenance operation is thus easily performed.

In addition to the basic configuration, the machine tool 100A of this embodiment is provided with a first isolation wall 20 and a second isolation wall 21 in an openable and closable manner. The first isolation wall 20 isolates each processing region located on each opposite side (front side) of the fixed module M1 and the movable module M2 and each processing region located on each opposite side (front side) of the fixed module M3 and the movable module M4. The second isolation wall 21 isolates the processing region of the movable module M4 from the processing region of each module M1, M2, and M3.

The first isolation wall 20 includes a fixed wall 20a which is integrally fixed to the movable module M2 and is provided to project forward from the adjacent movable module M4 side and a movable wall 20b which is provided in the fixed module M1 to be slidable forward and moves back and forth on the adjacent fixed module M3 side. The movable wall 20b may be slidably moved by hand or may be automatically moved by an appropriate driver.

Figure 5A:
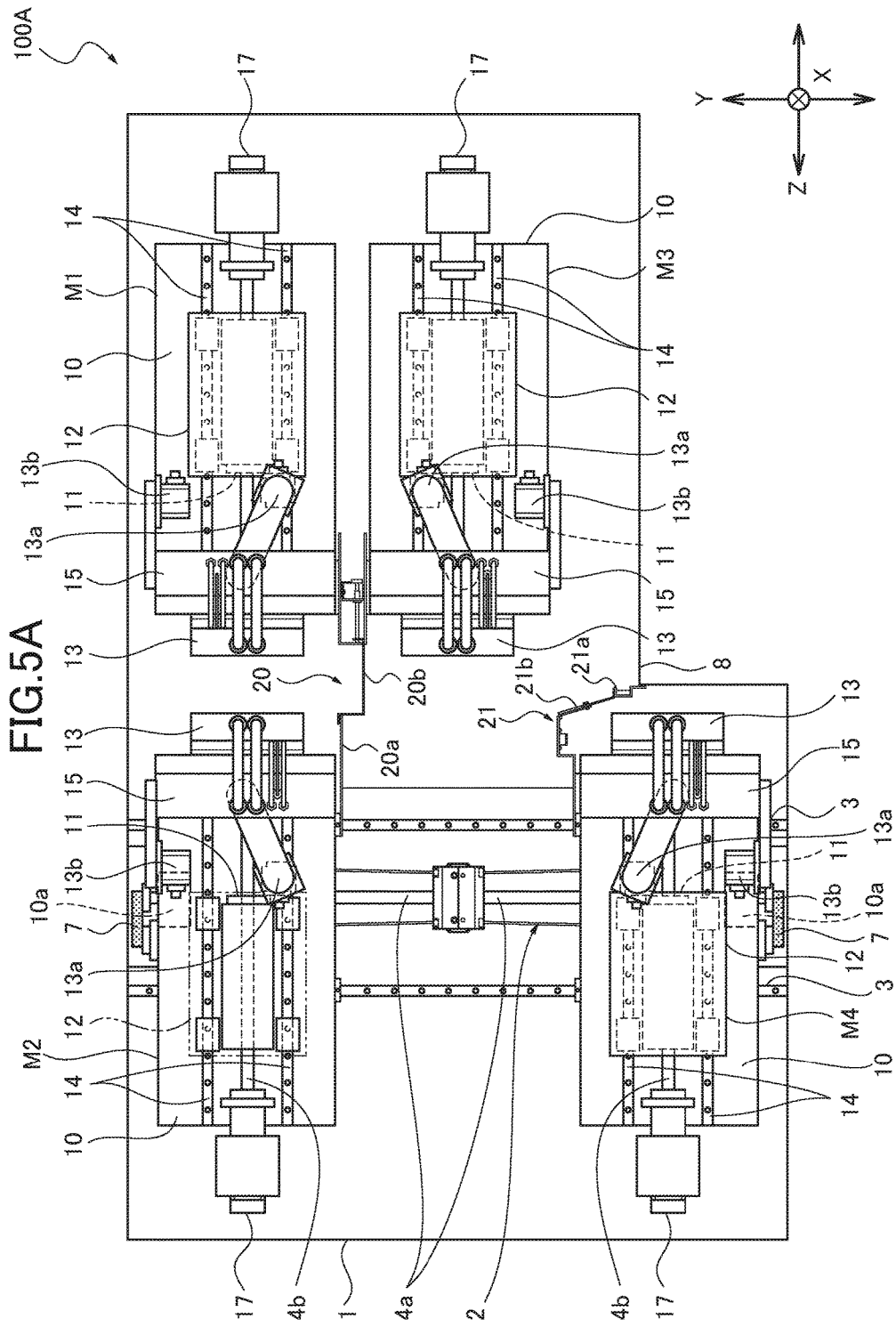
FIG. 5A is a plan view briefly showing a machine tool according to an embodiment, and showing a closed first isolation wall and a closed second isolation wall.

After the movable module M2 moves to the opposite position of the fixed module M1, the movable wall 20b slidably moves forward (direction of movable module M2), so that the leading end portion of the movable wall 20b is overlapped with the leading end portion of the fixed wall 20a, as shown in FIG. 5A, and the first isolation wall 20 is closed. Each processing region of the fixed module M1 and the movable module M2 is thereby isolated from each processing region of the fixed module M3 and the movable module M4.

The scatter of the cutting fluid and the cutting waste caused by the processing is therefore controlled to the fixed module M3 and the movable module M4 even when the workpiece is processed in each processing region of the movable module M2 and the fixed module M1. It becomes therefore unnecessary to stand by until the completion of the processing. In parallel with this processing, the transferring of the workpiece, the processing of the workpiece, the maintenance of the main spindle 11, and the carrying out of the workpiece from the movable module M4 are performed on the fixed module M3 and the movable module M4 sides. The operation efficiency is thus improved.

Similarly, the spread of the cutting fluid caused by the processing is controlled to the movable module M2 or the fixed module M1 even when the workpiece is processed by the fixed module M3 or the movable module M4. In parallel with this processing, the workpiece is supplied to the fixed module M1, the workpiece is transferred and processed by the fixed module M1 and the movable module M2, and the maintenance is performed.

The first isolation wall 20 opens by slidably moving the movable wall 20b in the direction (backward) opposite to the processing region, as shown in FIG. 5B. The movable module M2 is thereby allowed to move, and the movable module M2 moves to the opposite position of the fixed module M3 after the processing in the fixed module M1 or the movable module M2 is completed. By providing the end portion of the fixed wall 20a in the position which allows the movement of the movable module M2, the movable module M2 moves while processing the workpiece.

When the end portion of the fixed wall 20a is overlapped with the end portion of the movable wall 20b from the movable module M4 side, the negative effect on the movable module M4 or the fixed module M3 such as the spread of the cutting fluid and the cutting waste caused by the processing of the workpiece by the movable module M2 or the fixed module M1 and the negative effect on the movable module M2 or the fixed module M1 such as the spread of the cutting fluid and the cutting waste caused by the processing of the workpiece by the movable module M4 or the fixed module M3 are controlled on some level during the movement of the movable module M2.

The second isolation wall 21 includes a fixed wall 21a fixed on the bed 1 and a movable wall 21b provided to be foldable on the movable module M2 side adjacent to the movable module M4. By folding the movable wall 21b, the movable wall 21b is housed on the movable module M4 side, as shown in FIG. 5B, to allow the movement of the movable module M4. The movable wall 21b is manually or automatically folded.

After the movable module M4 moves to the opposite position of the recess 8, the movable wall 21b is unfolded, and one end side of the movable wall 21b abuts on the fixed wall 21a. The second isolation wall 21 is thereby closed as shown in FIG. 5A. The movable module M4 is therefore isolated from the processing regions of the other modules M1, M2, and M3. The workpiece is therefore carried out from the movable module M4 and the maintenance is performed in the movable module M4 with no effect of the processing such as the spread of the cutting fluid even while the workpiece is processed by any of the modules M1, M2, and M3.

By closing the first isolation wall 20 and the second isolation wall 21 to isolate the fixed module M1 and the movable module M2, the fixed module M3, and the movable module M4, the workpiece is independently processed and transferred in each processing region, and the maintenance is also independently performed. The operation performance in the machine tool 100A and the freedom degree of the operation are improved.

In the present embodiment, the fixed wall 21a is provided on the bed 1. However, the present disclosure is not limited to this embodiment. The fixed wall 21a may be provided on the fixed module M3 side. The configuration of the isolation wall of the present disclosure is not limited to the configurations of the first isolation wall 20 and the second isolation wall 21. An appropriate configuration may be adopted.

Figure 6:
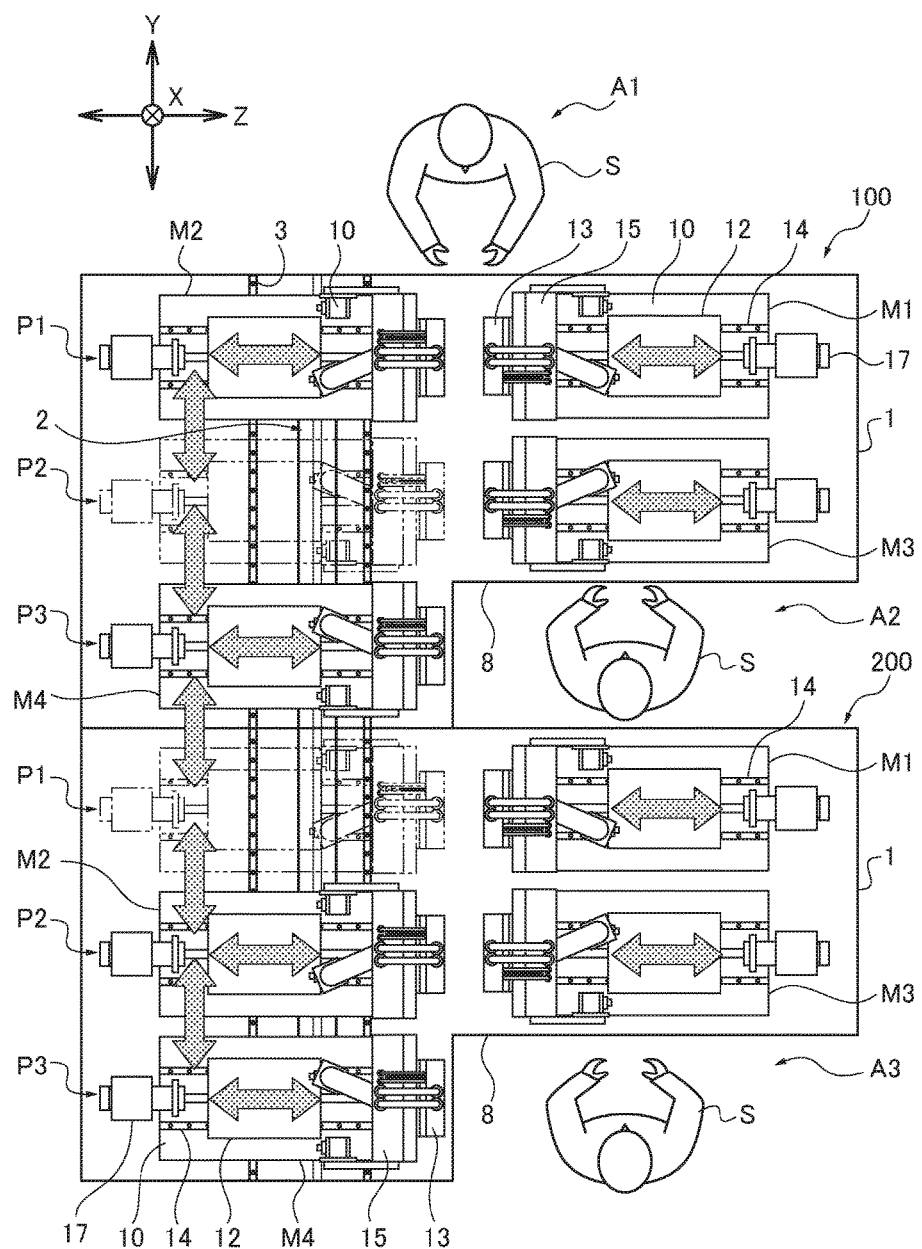
FIG. 6 is a plan view briefly showing a configuration of a workpiece processing system according to an embodiment.

Next, one embodiment of the workpiece processing system according to the present disclosure using the above-described machine tool will be described with reference to FIG. 6. The workpiece processing system of the present embodiment includes two machine tools 100 and 200 arranged in parallel in the Y-axis direction through the recess 8. In each of the machine tools 100 and 200, the fixed modules M1 and M3 and the movable modules M2 and M4 disposed to be movable in the Y-axis direction are provided on the bed 1 provided with the recess 8. In the present embodiment, the workpiece processed by the machine tool 100 disposed on the upstream side of the processing steps is additionally processed by the machine tool 200 disposed on the downstream side.

In the two machine tools 100 and 200, the guide rail 3 extending in the Y-axis direction is formed over both of the machine tools 100 and 200, and is shared by the two machine tools 100 and 200. The movable module M4 of the machine tool 100 on the upstream side reciprocates between the machine tool 200 on the downstream side and the machine tool 100 on the upstream side. The movable module M4 includes the function as a processing unit for the workpiece and the function as a supplying unit for the workpiece that carries the workpiece processed by the machine tool 100 on the upstream side to the machine tool 200 on the downstream side to be supplied.

In the workpiece processing system of the present embodiment, the workpiece is processed while being transferred among the modules M1, M2, M3, and M4 of the machine tool 100 on the upstream side in the above-described steps. When the machine tool 100 completes the processing, the movable module M4 moves to the opposite position P1 of the fixed module M1 of the machine tool 200 on the guide rail 3 in the Y-axis direction while griping the workpiece.

The main spindle 11 of the movable module M4 and the main spindle 11 of the fixed module M1 of the machine tool 200 move in the directions close to each other to transfer the workpiece between the movable module M4 and the fixed module M1 of the machine tool 200.

After the workpiece is transferred, the movable module M4 moves back to the machine tool 100 side. On the other hand, in the machine tool 200 by which the workpiece is received, the workpiece is processed by the fixed module M1. Then, the workpiece is carried out after the workpiece is processed while being transferred among the modules M1, M2, M3, and M4 in the steps similar to those of the machine tool 100. One machine tool is configured by the fixed modules M1 and M3 and the movable modules M2 of the machine tool 200, the movable module M4 of the machine tool 100, and the recess 8.

In the present embodiment, the machine tools each including a plurality of modules are arranged in parallel. The workpiece is thus processed in many steps, and a plurality of workpieces is processed in parallel. The processing productivity is therefore improved. In the maintenance, the movable modules M2 and M4 of each machine tool 100 and 200 move to face the fixed module M1 or the fixed module M3. The operator S therefore positions near the outer circumference edge (operation region A1 of FIG. 6) of the bed 1 on the fixed module M1 side or in the recess 8 (operation regions A2 and A3 of FIG. 6). The operator S and the tool thus easily reach each part of each module M1, M2, M3, and M4 and the transferring part of the workpiece between the fixed modules M1 and M3 and the movable modules M2 and M4, respectively. The adjustment such as the maintenance and the transferring of the workpiece is easily performed.

Next, another embodiment of the workpiece processing system according to the present disclosure will be described with reference to FIG. 7. In the present embodiment, the workpiece processing system includes only two movable modules M2 and M4. The two movable modules M2 and M4 are shared between the machine tools 100 and 200 arranged in parallel. The movable module M2 reciprocates between the opposite position P1 of the fixed module M1 of the machine tool 100 and the opposite position P2 of the fixed module M3 of the machine tool 200. The movable module M4 reciprocates between the opposite position P2 of the fixed module M3 of the machine tool 100 and the opposite position P3 of the recess 8 of the machine tool 200.

In the workpiece processing system of the present embodiment, for the processing by the machine tool 100, the movable modules M2 and M4 position on the machine tool 100 side, and the workpiece is processed in the above-described steps while being transferred among the respective modules M1, M2, M3, and M4.

When the machine tool 100 completes the processing, the movable module M4 moves to the opposite position P1 of the machine tool 200 to transfer the workpiece with the fixed module M1 of the machine tool 200. After that, the movable modules M2 and M4 move on the machine tool 200 side, and operate as the movable modules of the machine tool 200. The workpiece is thereby processed by each of the modules M1, M2, M3, and M4 while being transferred among the modules. After the processing is completed, the movable module M4 moves to the opposite position P3 of the recess 8 to carry out the workpiece.

As described above, in the workpiece processing system of the present embodiment, the machine tools each having a plurality of modules are arranged in parallel. The workpiece is thereby processed in many steps, and the processing performance is improved. The number of movable modules is further reduced to lower the cost and the weight of the workpiece processing system. In the maintenance, the movable modules M2 and M4 move to face the fixed module M1 or the fixed module M3 of the machine tools 100 and 200. The operator S thereby positions in the operation region A1 near the outer circumference edge of the bed 1 on the fixed module M1 side of the machine tool 100 or the operation regions A2 and A3 in the recess 8. The adjustment such as the maintenance and the transferring of the workpiece is therefore easily performed.

Next, another embodiment of the workpiece processing system according to the present disclosure will be described with reference to FIG. 8. In the workpiece processing system of the present embodiment, three machine tools 100, 200, and 300 are arranged in parallel in the Y-axis direction through the recesses 8. The machine tools 100, 200, and 300 each include one movable module M2 (M2-1, M2-2, M2-3), and each movable module M2 is used not only as the movable module of the machine tool but also as the movable module of the adjacent machine tool, as shown in FIG. 8.

In the workpiece processing system of the present embodiment, when the processing is performed by the machine tool 100, the movable modules M2-1 and M2-2 position on the machine tool 100 side, and operate as the movable modules of the machine tool 100. The workpiece is processed while being transferred among the modules M-1, M2-1, M3, and M2-2.

Next, when the machine tool 200 performs the processing, the movable module M2-2 moves from the machine tool 100 to the machine tool 200 side while griping the workpiece, and the workpiece is transferred to the fixed module M1 of the machine tool 200. In this case, the movable module M2-3 moves to the machine tool 200 side, and operates as the movable module of the machine tool 200. The workpiece is processed while being transferred among the modules M1, M2-2, M3, and M2-3. In addition, the module M2-1 on the machine tool 100 side may be used as the movable module on the machine tool 200 side instead of the movable module M2-3.

After that, when the machine tool 300 performs the processing, the movable module M2-3 or the movable module M2-2 moves from the machine tool 200 to the machine tool 300 side while griping the workpiece to transfer the workpiece to the fixed module M1 of the machine tool 300. After that, when the movable module M2-3 moves to the opposite position P3 of the recess 8, the movable module M2-2 moves from the machine tool 200 side to the machine tool 300 side, and operates as the movable module of the machine tool 300. After the workpiece is processed while being transferred among the modules M1, M2-2, M3, and M2-3, the workpiece is carried out from the movable module M2-3 moved to the opposite position P3.

As described above, in the workpiece processing system of the present embodiment, the machine tools each including a plurality of modules are arranged in parallel. The workpiece is thereby processed in many steps, and the processing productivity is improved. The number of movable modules is reduced to lower the cost and the weight of the workpiece processing system. In the maintenance, the movable modules M2-1, M2-2, and M2-3 move to face the fixed module M1 or the fixed module M3 of any of the machine tools 100, 200, and 300. The operator S thereby positions in the operation region A1 near the outer circumference edge of the bed 1 on the fixed module M1 side of the machine tool 100 and the operation regions A2, A3, and A4 in the recess 8. The adjustment such as the maintenance and the transferring of the workpiece is easily performed.

In the workpiece processing system of each embodiment, the machine tool 100A including the isolation walls as shown in FIGS. 5A and 5B may be used. In this case, in the machine tool, by isolating the adjacent modules with the isolation wall, the workpiece is processed in each module, the workpiece is transferred among the modules, and the workpiece is carried out with no negative effect caused by the processing with another module. By isolating the processing regions on the module side in the processing with the isolation wall, the workpiece is transferred among the adjacent machine tools without considering the spread of the cutting fluid even when the workpiece is processed by the module of any of the adjacent machine tools.

Although the embodiments of the present disclosure have been described above, the present disclosure is not limited thereto. It should be appreciated that variations may be made in the processing steps using the machine tools according to the processing without departing from the scope of the present disclosure.

What is claimed is:

1. A machine tool comprising:
   a plurality of modules each including a workpiece holder that holds a workpiece and an operation part holder that holds an operation part for performing a predetermined operation to the workpiece held by the workpiece holder, the workpiece holder and the operation part holder being integrally provided; and
   a bed on which each of the modules is installed, wherein:
   the modules include two movable modules arranged in parallel and an opposite module disposed to face the two movable modules,
   the workpiece is processed while being transferred between at least one of the movable modules and the opposite module,
   the movable modules are arranged in parallel to be movable in a direction in which the movable modules are arranged,
   a recess is provided next to the opposite module, the recess being formed by cutting out the bed,
   at least one of the movable modules is movable to be aligned with the opposite modules, and
   at least one of the movable modules is provided to be movable to face the recess.

2. The machine tool according to claim 1, wherein
   the workpiece holder is a main spindle that grips the workpiece,
   the operation part is a tool that processes the workpiece gripped by the main spindle, and
   the operation part holder is a tool post that holds the tool.

3. The machine tool according to claim 1, wherein
   the opposite module is unmovably fixed on the bed as a fixed module.

4. The machine tool according to claim 1, wherein
   the opposite module is two modules arranged in parallel.

5. The machine tool according to claim 4, wherein
   the two movable modules comprise a first movable module and a second movable module, and
   the two opposite modules comprise a first opposite module and a second opposite module, and
   at least one of the first and second movable modules are movable to be aligned with at least one of the first and second opposite modules.

6. The machine tool according to claim 1, wherein an isolation wall that isolates processing regions for processing the workpiece is openably and closably provided between adjacent modules to be openable and closable.

7. A workpiece processing system comprising a plurality of machine tools according to claim 1 arranged in parallel such that the recess is provided therebetween.

8. The workpiece processing system according to claim 7, wherein
   the movable modules of the plurality of machine tools are movably provided and capable of facing the opposite module of respectively adjacent machine tools,
   the workpiece is transferred between the plurality of machine tools, and
   the workpiece is processed in a plurality of steps while being transferred between the plurality of machine tools.

9. The machine tool according to claim 1, wherein
the two movable modules comprise a first movable module and a second movable module, and each of the first and second movable modules are movable to be aligned with the opposite module.

10. A workpiece processing system comprising:
a plurality of machine tools, each of the machine tools, including:
   a plurality of modules each having a workpiece holder that holds a workpiece and an operation part holder that holds an operation part for performing a predetermined operation to the workpiece held by the workpiece holder, the workpiece holder and the operation part holder being integrally provided; and
   a bed on which each of the modules is installed, wherein
the modules include a movable module and an opposite module disposed to face the movable module,
the workpiece is processed while being transferred between the movable module and the opposite module,
a recess is provided next to the opposite module, the recess being formed by cutting out the bed,
the movable module is movable to be aligned with the opposite module,
the movable module is provided to be movable to face the recess,
the plurality of the machine tools is arranged in parallel such that the recess is provided therebetween, and
the movable module is commonly used as a movable module for one of the machine tools and as a movable module for another of the machine tools.

11. A workpiece processing system comprising:
a plurality of machine tools, each of the machine tools, including:
   a plurality of modules each having a workpiece holder that holds a workpiece and an operation part holder that holds an operation part for performing a predetermined operation to the workpiece held by the workpiece holder, the workpiece holder and the operation part holder being integrally provided; and
   a bed on which each of the modules is installed, wherein
the modules include a movable module and an opposite module disposed to face the movable module,
the workpiece is processed while being transferred between the movable module and the opposite module,
a recess is provided next to the opposite module, the recess being formed by cutting out the bed,
the movable module is movable to be aligned with the opposite module,
the movable module is provided to be movable to face the recess,
the plurality of the machine tools is arranged in parallel such that the recess is provided therebetween,
the workpiece processing system includes two movable modules, and
the two movable modules are commonly used as movable modules for each of the machine tools arranged in parallel.

* * * * *

UNITED STATES PATENT AND TRADEMARK OFFICE
CERTIFICATE OF CORRECTION

PATENT NO.      : 10,293,409 B2
APPLICATION NO. : 15/322676
DATED           : May 21, 2019
INVENTOR(S)     : Nakaya et al.

Page 1 of 1

It is certified that error appears in the above-identified patent and that said Letters Patent is hereby corrected as shown below:

On the Title Page

Item (57), Line 8, under Abstract, change "the these" to --these--.

In the Claims

In Column 12, Line 27 (Approx.), Claim 1, change "modules," to --module,--.

Signed and Sealed this
Seventeenth Day of September, 2019

Andrei Iancu
*Director of the United States Patent and Trademark Office*